United States Patent Office 2,763,632
Patented Sept. 18, 1956

2,763,632

ORGANOTIN OXIDE-ESTER REACTION PRODUCTS AND VINYL CHLORIDE RESINS STABILIZED THEREWITH

Ernest W. Johnson, Westfield, N. J., assignor to Metal & Thermit Corporation, New York, N. Y., a corporation of New Jersey No Drawing. Application April 25, 1952,
Serial No. 284,437

20 Claims. (Cl. 260—45.75)

This invention relates to organotin oxide-ester reaction products having utility as stabilizing agents for resins and the like, and to processes for manufacturing the same.

In accordance with this invention, the group of compounds may be generally designated as reaction products of organotin oxides and esters. More particularly these compounds may be illustrated by the following structural formula:

$$[R(COOR')_x][R''_2SnO]_{ax}$$

wherein R, R' and R" are aliphatic or aromatic hydrocarbon radicals, $x$ has a value of 1 or 2 and $a$ equals 2 or is within the range of 1.9–2.2. Thus, R' and R" may be an alkyl or aryl radical such as butyl, methyl, phenyl, hexyl, ethyl, etc. Similarly, R may be derived from a monobasic or dibasic aliphatic or aromatic acid such as butyric, acetic, and lauric acid, the dimer of linoleic acid, phthalic acid, stearic acid, maleic, fumaric, crotonic and sorbic acid, etc.

The organotin oxide-ester reaction products of this invention are stabilizers for resins, particularly vinyl chloride-containing resins in quantities as low as ½% of the weight of the resin. This superior stabilizing property is equally applicable to resin compositions containing plasticizers, such as the phthalate type plasticizers.

The organotin oxide-ester reaction products having the above structural formula may be prepared by reacting an organotin oxide with an ester under conditions of elevated temperature and for a sufficient period of time to effect complete reaction therebetween.

In the preparation of these ester-organotin oxide compounds, it is necessary that the reactants be substantially free of water and that the reaction be carried out without undue exposure to moist air due to the reactivity of water with organotin oxide ester compound thereby effecting a reduced yield of the desired reaction products. However, minor quantities of water can be tolerated, because no other injurious effects of water have been observed.

Most of the resultant reaction products possess the inherent property of being extremely soluble even at room temperature in an excess of the ester utilized in the formation of the present novel reaction products or in other organic solvents. This is in direct contrast to the non-solubility of the organotin oxides in esters at room temperature, and the partial solubility of the oxides in esters at elevated temperatures. Accordingly, the solubility characteristics of these products is positive proof that a reaction has occurred between the organotin oxide and the ester, rather than the mere dissolution of the organotin oxide in the ester.

The reaction mechanism for the formation of the organotin oxide-ester reaction products is clearly illustrated by the following equations:

1. $\quad RCOOR' + 2(R''_2SnO) \rightarrow RCOOR'(R_2SnO)_2$

2. $\quad R(COOR')_2 + 4(R''_2SnO) \rightarrow R(COOR')_2(R''_2SnO)_4$

These equations graphically show that a reaction occurs between the ester and the organotin oxide without the cleavage or separation of any atoms or radicals from either reactant. It further illustrates the necessity of two molecules of organotin oxide per each COOR' group contained in the ester. Thus, one mole of a monobasic acid ester reacts with two moles of organotin oxide, whereas, 4 moles of organotin oxide is required for a dibasic acid ester.

The ester-organotin compounds of this invention are usually waxy solids of rather indefinite melting points or viscous liquids. Most of them are soluble in organic solvents such as benzene, toluene, alcohols, acetone, etc. Concentrated solutions of these compounds tend to form a surface skin when exposed to moist air. Upon the addition of water to a solution of an ester-organotin compound in a water-miscible solvent, the alcohol R'OH is released, and in the presence of sufficient water, a precipitate may form. This precipitate, when freshly prepared, is soluble in dry organic solvents but may lose this solubility after standing for a period of time. In determining the "acid number" of an ester-organotin compound, it is found that one mole of potassium hydroxide is required for each mole of —COOR' in the ester portion of the compound. If a reaction mixture has been made employing an excess amount of ester or if insufficient time has been allowed for complete reaction, only that portion of the ester which has reacted with the organotin oxide is titrable. Contrary herewith, a mere solution of organotin oxide in an ester is non-titratable, and exhibits no "acid number." The "acid number" determination is made by dissolving a 4–5 gram sample of the compound in "Solox" (a denatured ethyl alcohol) and titrating with 1.0 N aqueous potassium hydroxide solution, using phenol-phthalein indicator, until the pink color of the indicator persists for at least 30 seconds. During the titration a precipitate forms which is found to be the organotin oxide portion of the compound.

It is believed that, structurally, these compounds may be regarded as derivatives of ortho-acids. Organotin oxide reaction products of esters of monobasic acids, probably possess the following structural form:

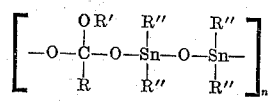

wherein R' and R" have the same meanings as defined above, and $n$ may have a value of 1 to about 5 according to molecular weight determinations. When $n$ is 1 we have a six-membered ring and when it is more than 1 we have a short linear polymer. Some of the polymer chains probably have units containing more than two

groups since the finished compounds appear commonly to have slightly more than two moles of organotin oxide per mole of ester. These occasional units may be formulated

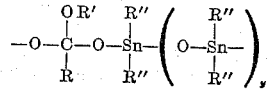

where $y$ is a low whole number probably not exceeding 4. This is in accord with the known polymeric nature of organotin oxides.

The reaction may be carried out over a rather wide range of temperatures, such as about 80° C. to 190° C. The more elevated temperature is preferred because the time of reaction is thereby shortened. However, when utilizing low boiling esters as one of the reactants, the temperature employed during the reaction must necessarily be limited to the neighborhood of the boiling point of said ester at least during the initial stages of the reaction, thereby requiring a longer period of time for a complete reaction. It is essential that the maximum temperature not exceed about 200° C. due to the danger of thermal degradation of the reactants or products at such high temperatures.

The time of reaction is variable, depending on the reaction temperature employed. A reaction of dibutyl tin oxide with ethyl acetate at reflux temperature (about 80° C.) required about 29 hours whereas the same oxide with dioctyl phthalate at 180° C. reacted in a matter of minutes.

The quantity of organotin oxide in the reaction batch should be equal to or be less than that required to react with all of the ester. Thus there should be 2 moles or less of organotin oxide per mole of —COOR' group in the amount of ester used. If less than 2 moles of organotin oxide per mole of —COOR' are used, some of the ester will remain unreacted. This excess may then be removed by distillation if desired. However, it may be preferable to leave the excess ester in the product to serve as solvent for the novel reaction products of this invention, especially if the ester has a high boiling point.

Another embodiment of this invention is the use of inert organic solvents as the medium for the reaction, such as toluene, benzene, etc. An excess amount of the ester reactant may also be utilized as the solvent for the reaction products. The presence of such solvent facilitates the desired reaction. The solvent or excess ester may be eliminated from the reaction product at the completion of the reaction by any suitable means, such as by vacuum distillation at elevated temperatures.

One method of producing the organotin oxide-ester reaction product comprises the steps of preheating the ester or mixture of esters in a vessel equipped with agitating means, adding thereto the organotin oxide in small increments and at such a rate that the mass remains fluid at all times and substantially all of the organotin oxide has dissolved, maintaining the mass at an elevated temperature until the reaction is complete. The reaction is deemed to be complete when an acid number determination, carried out as described above, indicates that one mole of —COOR' has reacted per 2 moles of dibutyltin oxide.

Another procedure utilized in the production of the instant products involves the admixture of all the organotin oxide with the ester and the subsequent slow heating of the reaction mixture to effect complete dissolution of the oxide and completion of the reaction as determined by an acid number analysis. In this procedure it is preferable to employ an excess amount of ester in order to maintain the reaction mixture in a fluid state and prevent the drying effect at one stage of the heating due to the swelling of the oxide. Alternatively, an inert solvent such as toluene or xylene may be added to the batch to keep it fluid.

The following examples are further illustrative of these novel organotin oxide-resin reaction products and their preparation, and it will be understood that the invention is not limited thereto:

*Example 1.—n-Butyl n-butyrate-dibutyltin oxide*

359 grams (1.44 moles) of dibutyltin oxide was slurried with benzene in a 1000 ml. three-necked flask equipped with a stirrer, thermometer, water trap and reflux condenser. Heat was applied by an electrical heating mantle to reflux the benzene. Only a trace of water was thus removed. 145 grams (1 mol.) of previously purified n-butyl n-butyrate was added to the slurry and the heating resumed. Benzene which collected in the water trap was removed in order to allow the boiling point of the slurry to rise. When the boiling temperature had reached 165° the batch was practically clear. It was further heated to 177° C. over a 25 minute period and then allowed to cool overnight.

The next day the excess ester was removed by vacuum distillation finishing at a pot temperature of 166° and a pressure of 90 mm. The product was a cloudy liquid which, on standing several days, froze to a waxy solid. This material contained 37.4% tin and had an acid number of 76.1. The mol. ratio of oxide to ester indicated by the analysis was thus 2.32 to 1. The product had a molecular weight of 1508.

A portion of the crude product was dissolved in dry acetone and filtered under moisture-free conditions, after which most of the acetone was removed by distillation. There was left a clear solution of the product in acetone which contained 29.1% Sn and had an acid number of 63.2. The mol ratio of oxide to ester in the product was thus 2.17 to 1. Refractionation of the stripped benzene and ester showed no appreciable quantity of substances other than benzene and n-butyl n-butyrate.

*Example 2.—n-Hexyl acetate-dibutyltin oxide*

100.9 grams (0.7 mole) of n-hexyl acetate (B. P. 168–170°) was heated to 70° C. in a 500 ml., 3-neck flask equipped with a stirrer, a thermometer, and a reflux condenser. 174.2 grams (.7 mole) of dibutyltin oxide was weighed out and about half of it added to the hot ester and mixed in thoroughly by mechanical stirring. With the stirrer still operating the temperature was brought to 145° C. at which time the mass had become nearly clear. The balance of the oxide was then added and heating resumed. The mass became clear quickly. It was then heated further to 150° C. and held at this temperature for a few minutes. There was no refluxing at any time during the above operations.

After partial cooling a downward condenser was attached to the flask and the excess of ester was stripped off under water-jet vacuum, finishing at a pot temperature of 156° C. The product was a light colored liquid which weighed 218 grams. It contained 37.7% Sn and had an acid number of 83 from which it is calculated that the molar ratio of oxide to ester in the compound was 2.15 to 1.

*Example 3.—n-Butyl acetate-dibutyltin oxide*

140 grams (0.56 mol.) of dibutyltin oxide was mixed with 172 grams (1.48 mols.) of redistilled butyl acetate (B. P. 123–126°, mostly 124°). Without stirring, the mixture was heated slowly until it became clear. At this time the temperature was about 130° C. and ester was refluxing. Refluxing was continued for about 2¼ hours and then the reaction mass was allowed to cool overnight. Next day the excess of ester was stripped by distillation at atmospheric pressure, finishing at a pot temperature of 150° C.

The product was a somewhat cloudy, tan liquid which became entirely solid after standing for several days. It contained 39.2% tin and had an acid number of 90.2; thus the mol. ratio of oxide to ester in the compound was 2.06 to 1.

The ester which had been stripped off was redistilled and shown to be almost pure butyl acetate.

*Example 4.—Ethyl acetate-dibutyltin oxide*

132 grams (0.53 mol.) of dibutyltin oxide was added to 93 grams (1.06 mols.) of ethyl acetate in a 3-neck flask equipped with stirrer, thermometer and reflux condenser. The mixture was too stiff for the stirrer so about 90 grams more ethyl acetate was added. The mixture was heated to cause the ester to reflux. When refluxing had continued for about 26 hours the temperature had risen from 77° to 80° and most of the oxide had dissolved. Refluxing was then continued for 3 hours, the temperature remaining at 80° C. After cooling, the mixture was filtered by gravity, about 5½ grams of residue (not washed) being removed.

The excess ethyl acetate was stripped from the filtrate by distillation, finishing at a pot temperature of 150° C. The product was a viscous, slightly tan liquid which became solid on standing for several days. It contained 40.95% tin and had an acid number of 98.4; thus the mol ratio of oxide to ester in the compound was 1.97 to 1.

*Example 5.—Methyl laurate-dibutyltin oxide*

In a preliminary test it was found that dibutyltin oxide reacted with methyl laurate at about 150° C. to yield an oily liquid which did not crystallize when cooled.

In another test 1.92 grams (.0090 mol.) of methyl laurate was mixed with 2.314 grams (.0093 mol.) of dibutyltin oxide in a 50 ml. Erlenmeyer flask and heated on a hot plate for some time after the mixture became clear. The total batch was titrated for acid number. 0.277 grams (.0049 mol.) of potassium hydroxide was consumed in the titration indicating that the compound had 1.9 mols of oxide per mol of ester.

In still another test 29.1 grams (0.117 mol.) if dibutyltin oxide was mixed with 25 grams (0.117 mol.) of methyl laurate in a 100 ml. Erlenmeyer flask and heated on a hot plate to about 155° C. The product remained as a clear viscous liquid when cold. This material was tested as a stabilizer for polyvinyl chloride by mixing together 2 parts of the material, 40 parts of di-2-ethyl hexyl phthalate and 100 parts of Geon 101 (a polyvinyl chloride resin), milling the blend on hot rolls and aging pieces of the resulting sheet in an oven maintained at 320° F. After 4 hours of aging the plastic had become yellow. However, a similar sheet without the stabilizer became black after 2 hours of aging.

*Example 6.—Dimer acid, methyl ester-dibutyltin oxide*

5.9 grams of an ester described as the methyl ester of the dimer of linoleic acid was mixed with 5 grams of dibutyltin oxide and heated. A clear, light-colored, very viscous product resulted.

In another experiment 58.3 grams of the same ester was mixed with 24.6 grams of dibutyltin oxide in a 500 ml. flask equipped with a stirrer and reflux condenser. The reflux condenser was vented to a trap cooled by a mixture of solid carbon dioxide and acetone. The stirrer was started and heat was applied to the flask by an electric heating mantle until the temperature of the batch reached about 180° C. No material collected in the cold trap.

The reaction product was a viscous, light-colored liquid.

*Example 7.—Ethyl butyrate-dibutyltin oxide*

116 grams of ethyl butyrate was heated to 64° C. in a 3-necked 500 ml. flask fitted with stirrer, thermometer and reflux condenser. About 125 grams (0.5 mol.) of dibutyltin oxide was added over a 15-minute period, heating being continued during this time. The mass became extremely thick but thinned out as the temperature reached about 124° and ester began to reflux. After about 10 minutes the boiling temperature had risen to 129° and the mass became quite mobile. Another batch of 125 grams of dibutyltin oxide was then added. Refluxing, which had been stopped by the cooling effect of the added oxide resumed when the batch reached 138° C. At this time the experiment was interrupted. When heating was resumed the next day refluxing commenced at a temperature of 148° C. Heating was continued for another hour at which time the boiling temperature had reached 156° C. and was apparently constant. A sample of the reaction mixture taken at this time contained 33.1% Sn and had an acid number of 79 from which it is calculated that dibutyltin oxide had reacted with ester at a mol ratio of 1.99 to 1.

Excess ester was stripped from the product leaving a pasty solid product. Analysis indicated a molar ratio of oxide to ester of 2.14 to 1.

*Example 8. Di-2 ethylhexyl phthalate-dimethyltin oxide*

50 grams of dimethyltin oxide was mixed with 100 grams of di-2 ethylhexyl phthalate in a flask fitted with thermometer, stirrer, reflux condenser and water trap, and heated by an electrical heating mantle. The temperature was brought to 190° C. and held for about 3 hours after which time the mixture became almost clear. Another batch of 50 grams of dimethyltin oxide was added and the mixture was held at 190°–200° C. for 3 hours. It was then practically clear. When cold it was still clear but very viscous and considerably discolored. Side reactions had occurred in this experiment as evidenced by the discoloration and also by the fact that a certain amount of volatile material, which appeared to be tetramethyl tin, was collected in the water trap during the experiment.

*Example 9.—Phenyl stearate-dimethyltin oxide*

50 grams of phenyl stearate was heated to 130° C. 22.8 grams of dimethyltin oxide was added over a 30 minute period. Then the batch was heated to 155° C. and held for one hour. After cooling the product was a clear, viscous liquid.

*Example 10.—n-Butyl n-butyrate-diphenyltin oxide*

50 ml. n-butyl n-butyrate was heated to 130° C. 19.2 grams of diphenyltin oxide was added over a 20 minute period. Then the batch was kept at 155° for 1 hour, at 165° for 6 hours. The batch still contained a large amount of solids which were filtered off. The filtrate contained 4.01% tin and had an acid number of 10.2; it therefore consisted of a solution in excess ester of a compound made up of 1.9 moles of diphenyltin oxide per mole of ester.

*Example 11. Phenyl phthalate-dibutyltin oxide*

50 grams of phenyl phthalate were reacted with 78.2 grams of dibutyltin oxide in accordance with the procedure of Example 9 except that the final heating was at 165° instead of 155° C. The product when cold was a very viscous liquid.

*Example 12.—Ethyl maleate-dibutyltin oxide*

17.1 (0.1 mole) grams of ethyl maleate was warmed in a small Erlenmeyer flask. To it was added 49 grams (0.2 mole) of dibutyltin oxide with manual stirring. The mixture was heated on a hot plate to about 200° C. While hot the product was a nearly clear, very viscous liquid. Upon cooling in a refrigerator the mass became pasty and appeared to contain some solids. We were not able to separate out these solids. The product was thereafter heated to 150–160° C. for 3 hours in a stream of dry nitrogen to remove excess ester. The resulting pasty solid was tested as a stabilizer for polyvinyl chloride plastics by the procedure described in Example 5. After 6 hours og aging the test sheet had become yellow; after 8 hours the sheet was somewhat darker and a black edge had begun to form.

*Example 13.—Ethyl fumarate-dibutyltin oxide*

50 grams of ethyl fumarate was reacted with 144.5 grams of dibutyltin oxide by the procedure of Example 9. The product was rather dark. It became solid on standing. Analysis showed it to contain 35.4% tin and an acid number of 82.3; the mole ratio of oxide to ester was thus 4.1 to 1.

*Example 14.—Di-2 ethylhexyl maleate-dibutyltin oxide*

23.8 grams (.07 mole) of di 2 ethylhexyl maleate was heated to 150° C. 34.8 (0.14 mole) grams of dibutyltin oxide was added over about a 30 minute period. Thereafter the batch was held at 150° for a further 10 minutes and then allowed to cool. There was no loss in weight of the batch. The product was a viscous liquid of light color. Analysis indicated that 52.5% of the ester had reacted and that therefore the mole ratio of oxide to ester in the compound was 3.8 to 1.

*Example 15.—Butyl crotonate-dibutyltin oxide*

50 grams of butyl crotonate was reacted with 87.5 grams of dibutyltin oxide under the conditions of Example 9 except that the batch was given additional heating for 1 hour at 160–165° C. The product when cold was a viscous, amber liquid containing some solid which did not filter out when the batch was passed through filter paper. Analysis indicated a mole ratio of oxide to ester of 1.7 to 1. It is believed that this sample had reacted with moisture during the heating and filtration with the result that a slightly high acid number was found.

*Example 16.—Ethyl sorbate-dibutyltin oxide*

50 grams of ethyl sorbate and 88.7 grams of dibutyltin oxide were reacted by the procedure of Example 9. The product was a somewhat dark, viscous liquid. It was not entirely soluble in "Solox" and therefore an acid number determination was not made.

*Example 17.—Di-2 ethylhexyl phthalate-dibutyltin oxide*

15 pounds of di-2 ethylhexyl phthalate was heated to 100° C. in a 22 liter 3-neck flask, equipped with a stainless steel paddle type stirrer and a thermometer. With the stirrer operating at about 110 R. P. M., 15 pounds of dibutyltin oxide was added slowly. The temperature was brought to 180° C. and maintained for 5 minutes after which the batch was allowed to cool. The product was an almost clear, light colored liquid. It contained 22.85% tin and its acid number was 58.8. Thus it consisted of a solution in di-2 ethylhexyl phthalate of a compound made up of 3.7 moles of oxide per each mole of ester.

It has also been discovered and is a feature of this invention that the novel organotin oxide-ester reaction products will function as excellent stabilizers for resin compositions, particularly vinyl chloride containing resin compositions containing plasticizers, and when intimately dispersed therein, will provide plastic compositions of improved resistance to heat deterioration. Excellent films are obtained from the aforesaid plastic compositions which exhibit a high degree of stability. The optimum concentration of the aforesaid organotin oxide-resin reaction products useful as a stabilizer is about ¾–1½% based on the weight of the vinyl resin, although as little as ½% is also effective and larger quantities, on the order of about 3% effects longer lasting stabilization. The resin composition containing this concentration of stabilizer produces a stable plastic film, resistant to darkening at elevated temperatures as evidenced by the results of the heat tests in Table I.

The vinyl resin employed was a polyvinyl chloride resin (Geon 101). The stabilizer was first mixed with and dissolved in 50 parts by weight of di-2 ethyl hexyl phthalate plasticizer and then mixed with 100 parts by weight of the resin.

The mixture was then milled for 5 minutes on a two-roll differential speed mill heated to 320 to 325° F. After banding, the band was cut frequently and returned to the bank. After the lapse of 5 minutes the composition was taken off as a sheet about 40 mills thick.

The sheet was cooled and subsequently cut into strips one inch wide by six inches long. These strips were laid flat on four cold glass plates which were then placed in a circulating air oven maintained at 350° F. The plates were removed at intervals such that the first was exposed for 15 minutes, the second for 30 minutes, the third for 45 minutes and the fourth for 1 hour. The aged samples were rated visually, the degree of stability of the vinyl chloride resin film being represented by the depth of coloration.

A set of arbitrary standards with numerical ratings to represent the depth of coloration was used as the means of rating the aged samples. Number 7 represents a completely transparent, colorless film and is the highest possible rating. Number 1 is the lowest rating and defines a dark amber color or anything darker than this. Intermediate numbers describe a degree of discoloration between these two extremes.

| Stabilizer | Parts of Stabilizer Per 100 Parts of Resin | Color Rating | | | | |
|---|---|---|---|---|---|---|
| | | Milled Sheet | Aged 15 min. | Aged 30 min. | Aged 45 min. | Aged 60 min. |
| None [1] | | 6 | 6 | 3 | 1 | 1 |
| Dibutyltin dilaurate | 2 | 6 | 6 | 4 | 3 | 1 |
| Product of Ex. 1, unfiltered | [2] 1 | 6 | 6 | 5 | 4 | 4 |
| Product of Ex. 1, filtered [3] | [2] 1.3 | 6 | 6 | 5 | 4 | 4 |
| Product of Ex. 3 | [2] 1.2 | 6 | 6 | 5 | 4 | 3 |
| Product of Ex. 4 | [2] 0.91 | 6 | 6 | 5 | 4 | 3 |
| Product of Ex. 7, unstripped | [2] 1.15 | 6 | 6 | 5 | 4 | 3 |
| Product of Ex. 7, stripped | [2] 0.95 | 6 | 6 | 5 | 4 | 3 |
| Product of Ex. 9 | 2 | 6 | 5 | 4 | 3 | 2 |
| Product of Ex. 11 | 2 | 6 | 5 | 5 | 4 | 2 |
| Product of Ex. 13 | 2 | 6 | 6 | 5 | 4 | 4 |
| Product of Ex. 14 | [2] 1.3 | 6 | 6 | 6 | 5 | 4 |
| Product of Ex. 15 | 2 | 6 | 6 | 4 | 3 | 2 |
| Product of Ex. 16 | 2 | 6 | 6 | 5 | 4 | 3 |
| Product of Ex. 17 | 2 | 6 | 6 | 5 | 4 | 4 |

[1] 0.25 part calcium stearate lubricant added to prevent sticking on mill.
[2] Quantity chosen so that finished plastic has same tin content as one made with 2 parts of dibutyltin dilaurate.
[3] Contained a little acetone.

This table clearly discloses the unusual stabilizing activity of the organotin oxide resin compounds in comparison to a resin minus a stabilizer or with other known stabilizers such as dibutyl tin dilaurate.

Although organotin oxide compounds prepared from all types of esters are effective as stabilizers, some of those made from maleate esters and other dienophilic esters appear to possess the added advantage of being more resistant to heat aging. More specifically, plastics stabilized with this latter group of compounds are found to have a little less color after heat aging than those stabilized with other ester-organotin oxide compounds. The improvement, however, is slight since it appears that the dienophilic action of the esters is largely lost when the ester group bonds rearrange to the ortho-acid structure of our compounds.

Other uses of the organotin derivatives are as stabilizers for other chlorinated materials, as rubber accelerators, rubber antioxidants, lube oil additions and polymerization accelerators.

While the invention has been described with reference to various examples and embodiments, it will be apparent to those skilled in the art that various modifications may be made and equivalents substituted therefor, without departing from the principles and true nature of the present invention.

What is claimed by Letters Patent is:

1. A method of preparing hydrocarbon tin oxide-ester compounds which comprises reacting hydrocarbontin oxide with a hydrocarbon ester of a carboxylic acid at elevated temperatures and for a sufficient period of time to effect complete reaction, and recovering the reaction products.

2. A method of preparing hydrocarbontin oxide-ester compounds which comprises reacting a substantially water-free hydrocarbontin oxide with a substantially water-free hydrocarbon ester of a carboxylic acid at elevated temperatures and for a sufficient period of time to effect complete reaction, and recovering the reaction products.

3. A method of preparing hydrocarbon tin oxide-ester compounds which comprises reacting about 2 moles of a hydrocarbontin oxide with about one mole of a hydrocarbon ester of a monobasic carboxylic acid at elevated temperatures and for a sufficient period of time to effect complete reaction, and recovering the reaction products.

4. A method of preparing hydrocarbontin oxide ester compounds which comprises reacting about 4 moles of a hydrocarbontin oxide with about one mole of a hydrocarbon ester of a dibasic carboxylic acid at elevated temperatures and for a sufficient period of time to effect complete reaction, and recovering the reaction products.

5. A method of preparing hydrocarbontin oxide-ester compounds which comprises reacting a hydrocarbontin oxide with a hydrocarbon ester of a carboxylic acid at a temperature within the range of about 80°–190° C. and for a sufficient period of time to effect complete reaction, and recovering the reaction products.

6. A method of preparing hydrocarbontin oxide-ester compounds which comprises reacting a hydrocarbontin oxide with a hydrocarbon ester of a carboxylic acid at a temperature within the range of about 80°–190° C. in the presence of an inert solvent and for a sufficient period of time to effect complete reaction, and recovering the reaction products.

7. A method of preparing hydrocarbontin oxide-ester compounds which comprises reacting a hydrocarbontin oxide with a hydrocarbon ester of a carboxylic acid at a temperature within the range of about 80°–190° C. in the presence of an excess amount of the ester reactant which functions as a solvent for the reactants and for a sufficient period of time to effect complete reaction, and recovering the reaction products.

8. A method of producing hydrocarbontin oxide-ester reaction products which comprises preheating a hydrocarbon ester of a carboxylic acid reactant, adding thereto with agitation and in small increments hydrocarbontin oxide, maintaining the reaction mass at an elevated temperature until the reaction is complete, and recovering the compounds.

9. A method of producing hydrocarbontin oxide-ester reaction products which comprises preheating a hydrocarbon ester of a carboxylic acid reactant, adding thereto with agitation and in small increments hydrocarbontin oxide, maintaining the reaction mass at a temperature of about 80°–190° C. until the reaction is complete, and recovering said compounds.

10. A method of producing hydrocarbontin oxide-ester compounds which comprises admixing a hydrocarbontin oxide with an excess amount of a hydrocarbon ester of a carboxylic acid, slowing heating the reaction mixture to effect complete dissolution of the oxide in the ester, maintaining the mixture at a temperature of about 80°–190° C. for a period of time sufficient to effect complete reaction, and recovering the compounds.

11. A method of producing hydrocarbontin oxide-ester compounds which comprises admixing a hydrocarbontin oxide with a hydrocarbon ester of a carboxylic acid in the presence of an inert organic solvent, slowly heating the reaction mixture to effect complete dissolution of the oxide in the ester, maintaining the mixture at a temperature of about 80°–190° C. for a period of time sufficient to effect complete reaction, and recovering the compounds.

12. A composition of matter comprising the reaction product of an organo-tin oxide having the empirical formula $R_1R_2SnO$ where $R_1$ and $R_2$ represent monovalent hydrocarbon groups, with a hydrocarbon ester of a carboxylic acid.

13. A composition of matter comprising the reaction product of an organo-tin oxide having the empirical formula $R_1R_2SnO$ where $R_1$ and $R_2$ represent monovalent hydrocarbon groups, with a hydrocarbon ester of maleic acid.

14. A stable vinyl chloride resin composition, containing intimately dispersed therein as a stabilizing agent, about one-half to 3% of a reaction product of a hydrocarbontin oxide and a hydrocarbon ester of a carboxylic acid.

15. A stable vinyl chloride resin composition, containing intimately dispersed therein as a stabilizing agent, about ¾ to 1½% of a reaction product of a hydrocarbontin oxide and a hydrocarbon ester of a carboxylic acid.

16. A reaction product of n-butyl-n-butyrate and dibutyltin oxide.

17. A reaction product of methyl laurate and dibutyltin oxide.

18. A reaction product of di-2-ethylhexyl phthalate and dimethyltin oxide.

19. A reaction product of phenyl phthalate and dibutyltin oxide.

20. A method of preparing a reaction product of a hydrocarbon oxide and a hydrocarbon ester of a carboxylic acid which comprises reacting a hydrocarbontin oxide with a hydrocarbon ester of a carboxylic acid in an amount of about 2 moles of hydrocarbontin oxide for each mole of hydrocarbon ester groups present in the ester, at a temperature of about 80°–190° C. for a period of time sufficient to effect complete reaction therebetween and recovering the reaction product.

References Cited in the file of this patent

UNITED STATES PATENTS 2,597,920   Carroll _____ May 27, 1952